United States Patent
Oguri et al.

(10) Patent No.: US 9,855,656 B2
(45) Date of Patent: Jan. 2, 2018

(54) ROBOT CONTROL DEVICE FOR CONTROLLING MOTOR-DRIVEN ROBOT

(71) Applicant: FANUC CORPORATION, Yamanashi (JP)

(72) Inventors: Kenichiro Oguri, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/241,231

(22) Filed: Aug. 19, 2016

(65) Prior Publication Data
US 2017/0060103 A1    Mar. 2, 2017

(30) Foreign Application Priority Data

Aug. 25, 2015 (JP) .................. 2015-165415

(51) Int. Cl.
*G05B 13/02* (2006.01)
*B25J 9/16* (2006.01)

(52) U.S. Cl.
CPC ... *B25J 9/1628* (2013.01); *G05B 2219/40412* (2013.01); *G05B 2219/40488* (2013.01); *Y10S 901/41* (2013.01); *Y10S 901/46* (2013.01)

(58) Field of Classification Search
CPC ................................................. G05B 13/0205
USPC ............ 318/568.16, 568.11, 568.1, 567, 560
See application file for complete search history.

(56) References Cited

U.S. PATENT DOCUMENTS 7,013,200 B2 *  3/2006  Wakui ................. G05D 1/0272
                                                            180/7.1

FOREIGN PATENT DOCUMENTS

| JP | 5158542 A | 6/1993 |
|---|---|---|
| JP | 2001222324 A | 8/2001 |
| JP | 2011136416 A | 7/2011 |
| JP | 2012168926 A | 9/2012 |

OTHER PUBLICATIONS

English Abstract and Machine Translation for Japanese Publication No. 2012-168926 A, published Sep. 6, 2012, 24 pgs.
English Abstract and Machine Translation for Japanese Publication No. 2011-136416 A, published Jul. 14, 2011, 13 pgs.
English Abstract and Machine Translation for Japanese Publication No. 2001-222324 A, published Aug. 17, 2001, 13 pgs.
English Abstract and Machine Translation for Japanese Publication No. 05-158542 A, published Jun. 25, 1993, 10 pgs.

* cited by examiner

*Primary Examiner* — David S Luo
(74) *Attorney, Agent, or Firm* — Fredrikson & Byron, P.A.

(57) ABSTRACT

A robot control device includes a first sensor which is used in a first range including the entirety of the operating range of the robot, a second sensor which is used in a second range including at least a part of the operating range of the robot, and a range storing unit for storing a third range included in both the operating range and the second range. The robot control device also includes a ratio setting unit for setting a ratio between a first control input obtained using the first sensor and a second control input obtained using the second sensor with respect to control inputs to the motor based on the comparison of the third range and the position and posture of the robot, and an addition unit for adding the first control input and the second control input together in accordance with the set ratio.

5 Claims, 3 Drawing Sheets

RATIO OF FIRST CONTROL INPUT

ROBOT CONTROL DEVICE FOR CONTROLLING MOTOR-DRIVEN ROBOT

BACKGROUND OF THE INVENTION

1. Field of the Invention

The present invention relates to a robot control device for controlling a motor-driven robot.

2. Description of the Related Art

Conventionally, robots are controlled by feeding back only the angular velocity, rotation angle, and torque (current value) of a motor, for example, a servomotor. In such a control method, it is only required to prepare only an encoder or an electric current detector attached to the motor.

However, in recent years, robots have been used in various fields, and conventional control methods may be insufficient. Thus, in addition to an encoder or an electric current detector, another sensor has been used to control a robot.

In, for example, Japanese Unexamined Patent Publication (Kokai) No. 2012-168926, full-closed position control using an additional encoder is performed to reduce a position error caused by, for example, a transmission error of a decelerator. Further, in Japanese Unexamined Patent Publication (Kokai) No. 2011-136416, position control using a position-measuring instrument, such as a laser tracker or indoor GPS, is performed to accurately position an aircraft fuselage and other parts supported by a robot.

However, originally, a range, in which a robot is movable, does not necessarily coincide with a range, in which an additional sensor is applicable. Thus, a change of the control method, in which an additional sensor is used, may cause limitation of the operating range of the robot.

In an example, application of full-closed control to accurately operate a robot will be discussed below. In this respect, an angle encoder or a rotary encoder is used as an additional sensor. However, in order to attach such an additional sensor to the robot, it is necessary to drastically change the design of the robot. Thus, for economic reasons, a tape-type linear scale may be attached to an existing robot to perform full-closed control.

However, when the tape-type linear scale is used, a signal is interrupted at an end point of a tape. Thus, when the full-closed control is used, a rotary shaft would not rotate more than 360 degrees if the rotary shaft can rotate more than 360 degrees.

In another example, a control operation, in which a laser tracker is used to feed back the position and posture of an end effector of a robot, to accurately operate the robot, will be discussed below. In order to measure the position and posture using the laser tracker, it is necessary that a reflector attached to a robot or a tool of the robot can be seen from the tracker disposed around the robot.

However, depending on the posture of the robot, the reflector may not be seen due to a peripheral device, an arm of the robot, or a tool attached to the robot, which functions as an obstacle. Accordingly, a control operation using a laser tracker limits the operating range of the robot.

Thus, control systems may be switched so that a control operation using an additional sensor is performed when the additional sensor is necessary, and a control operation without an additional sensor is performed when the additional sensor is not necessary. Therefore, the original operating range of the robot is maintained.

In this respect, when the control systems are rapidly switched, a mechanical impact may occur, and accordingly, it is preferable that the control systems are smoothly switched. Further, when the control systems are switched in accordance with an operation program, the complexity of the grogram increases as the frequency of switching increases. Thus, it is preferable that the control systems are automatically switched.

Japanese Unexamined Patent Publication (Kokai) No. 2001-222324 discloses that the ratio between semi-closed control without an additional sensor and semi-closed control using an additional sensor, which are applied to position control, is changed by switching control gains, so that control systems are smoothly switched.

Japanese Unexamined Patent Publication (Kokai) No. 05-158542 discloses that control systems are switched depending on the property of an object to be controlled. Assuming that the position and posture of a robot are included in the property of an object to be controlled, the control systems can be switched depending on the position and posture of the robot.

SUMMARY OF THE INVENTION

However, in Japanese Unexamined Patent Publication (Kokai) No. 2001-222324, a position deviation in semi-closed control and a position deviation in full-closed control are used to switch gains. Thus, in a range in which the full-closed control is not applicable, the semi-closed control cannot be used, and accordingly, the operating range of a robot is restricted. Further, in Japanese Unexamined Patent Publication (Kokai) No. 05-158542, control systems cannot be smoothly switched.

The present invention is made in view of these problems. It is an object of the present invention to provide a robot control device, in which a control operation using an additional sensor and a control operation without using an additional sensor can be smoothly switched, without limiting the operating range of a robot.

In order to accomplish the above object, a first aspect of the invention provides a robot control device for controlling a robot to be driven by a motor including a first sensor which can be used in a first range including the entirety of the operating range of the robot, a first control unit for calculating a first control input to the motor, using a feedback value from the first sensor, a second sensor which can be used in a second range including at least a part of the operating range of the robot, a second control unit for calculating a second control input to the motor, using a feedback value from the second sensor or feedback values from both the first sensor and the second sensor, a range storing unit for storing a third range included in both the operating range of the robot and the second range, a ratio setting unit for setting a ratio between the first control input and the second control input with respect to control inputs to the motor, based on the comparison of the third range stored in the range storing unit and the position and posture of the robot, an addition unit for adding the first control input and the second control input together in accordance with the ratio set by the ratio setting unit, and a control performing unit for performing feedback control of the motor based on a result of the addition performed by the addition unit.

According to a second aspect of the invention, in the first aspect of the invention, the third range is an overlapping portion of the operating range of the robot and the second range.

According to a third aspect of the invention, in the first or second aspect of the invention, the ratio setting unit sets a ratio between the first control input and the second control input with respect to control inputs to the motor, based on at least one of a distance between the border of the third range, which is stored in the range storing unit, and the present position of the robot, and a difference between the border of the third range and the angle of each of shafts of the robot.

According to a fourth aspect of the invention, in any one of the first to third aspects of the invention, the ratio setting unit sets, in a stepwise manner, a ratio between the first control input and the second control input with respect to control inputs to the motor.

According to a fifth aspect of the invention, in any one of the first to fourth aspects of the invention, a transmission unit for transmitting an output of the ratio setting unit to an operator is provided.

These and other objects, features and advantages of the present invention will become more apparent in light of the detailed description of exemplary embodiments thereof as illustrated by the drawings.

DETAILED DESCRIPTION

Figure 1:
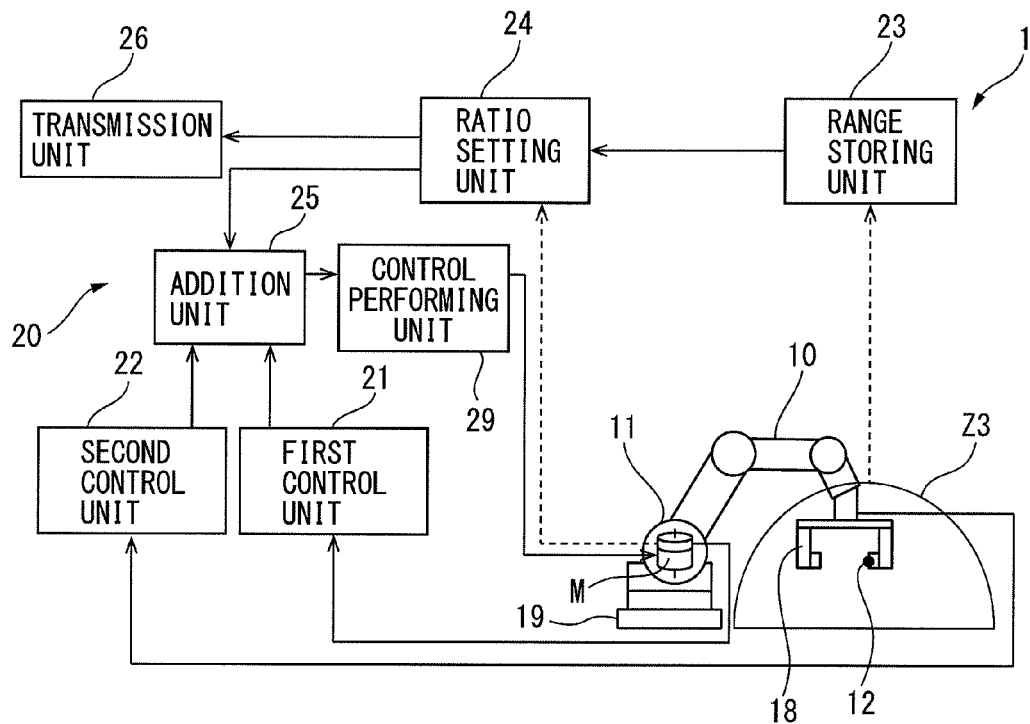
FIG. 1 is a block diagram of a robot control device according to the present invention.

Embodiments of the present invention will be described below with reference to the accompanying drawings. In the following drawings, similar components are designated with the same reference numerals. To facilitate understanding of the present invention, the scales of the drawings have been changed.

FIG. 1 is a block diagram of a robot control device based on the present invention. A system 1 shown in FIG. 1 mainly includes a robot 10 and a robot control device 20 for controlling the robot 10. The robot 10 is, for example, a hexaxial vertical articulated robot. Further, the robot 10 has, on a tip end of an arm thereof, a hand 18.

FIG. 1 shows a motor, for example, a motor M for driving a shaft of the robot 10, and a position detector, for example, an encoder E for detecting a rotational position of the motor M. The motor M and the encoder E are shown as representatives. In fact, a plurality of motors M and a plurality of encoders E, the number of which corresponds to the number of shafts of the robot 10, are embedded in the robot 10. In the specification of this application, the encoders E are hereinafter referred to collectively as a first sensor 11. Note that the encoders E are also used to detect the position and posture of the robot 10.

Figure 2:
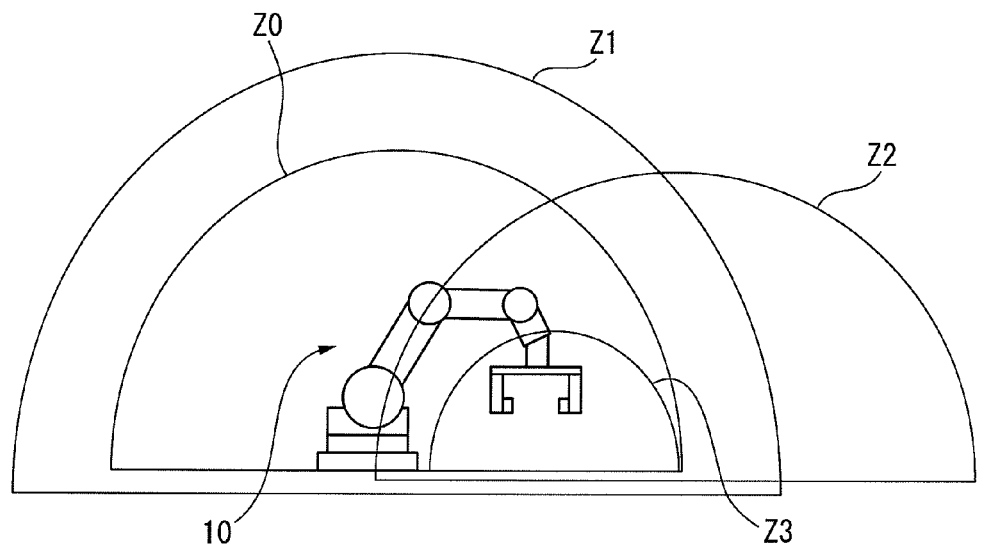
FIG. 2 is a view of an operating range of a robot.

FIG. 2 is a view of the operating range of a robot. As shown in FIG. 2, the first sensor 11 can be used in a first range Z1 including the entirety of an operating range Z0 of the robot 10. Note that the first sensor 11 may be another sensor which can be used in the entirety of the operating range Z0 of the robot 10 and which can measure the quantity of state necessary to control the robot 10. For example, the first sensor 11 may be a single sensor disposed in a robot supporting part 19 of the robot 10.

Referring again to FIG. 1, a second sensor 12 is disposed at a tip end of the hand 18. The second sensor 12 is a position measuring instrument, for example, a laser tracker or an indoor GPS, which can measure the position of the tip end of the robot 10. Alternatively, the second sensor 12 may be a combination of a tape-type linear scale or an encoder for full-closed control. The second sensor 12 may be another single sensor or a plurality of other sensors, which can measure the quantity of state necessary to control the robot 10.

As can be seen from FIG. 2, the second sensor 12 can be used in a second range Z2 including at least a part of the operating range Z0 of the robot. Further, the first range Z1 and the second range Z2 are different from each other, and the first range Z1 includes the entirety of the operating range Z0 of the robot 10, and accordingly, it will be understood that the first sensor 11 can be used in a range in which the second sensor 12 cannot be used. Thus, it is not required that the second sensor 12 can be used in the entirety of the operating range Z0 of the robot 10.

Referring again to FIG. 1, the robot control device 20 is a digital computer, which includes a first control unit 21 for calculating a first control input to the motor M using feedback values from the first sensor 11. Strictly speaking, the first control unit 21 calculates the first control input to the motor M based on measured values of the first sensor 11 and operation commands for the robot.

Furthermore, the robot control device 20 also includes a second control unit 22 for calculating a second control input to the motor M using feedback values from the second sensor 12 or feedback values from both the first sensor 11 and the second sensor 12. In a third range Z3 shown in FIG. 2, a second control input is applicable. Strictly speaking, the second control unit 22 calculates the second control input to the motor M based on measured values of the second sensor 12 or both measured values of the first sensor 11 and measured values of the second sensor 12, and operation commands for the robot 10.

In this respect, the operation commands for the robot 10 are command values determined in accordance with the purpose of operation of the robot 10. For example, the operation commands for the robot 10 include the position of the tip end of the robot 10 or the angle of each shaft of the robot 10. Alternatively, the operation commands of the robot 10 may include a force generated by the tip end of the robot 10 or a torque of each shaft of the robot 10.

Further, the first control input and second control input to the motor M are the quantity of state defining the state of the motor M. For example, the first control input and the second control input include the rotation angle or angular velocity or the torque of the motor M. Note that, as will be described later, the second control input is added to the first control input, and accordingly, it is necessary to set the second control input and the first control input in the same dimension.

Furthermore, as shown in FIG. 1, the robot control device 20 includes a range storage unit 23 for storing the third range Z3 included in both the operating range Z0 of the robot 10 and the second range Z2. In the third range Z3, the robot 10 is controlled by the second control input, using the second sensor 12. The third range Z3 is a range in which an operator of the robot 10 wishes to operate the robot 10, using the second sensor 12, based on the second control input.

The third range Z3 is a range having any shape in a range common to a range, in which the second sensor 12 can be used, and the operating range Z0 of the robot 10. Thus, usually, the third range Z3 is preliminarily designated by an operator of the robot 10. However, the entirety of the overlapped portion of the operating range Z0 of the robot 10 and the second range Z2 may be defined as the third range Z3. Thus, the third range Z3 can be automatically decided. Note that the third range Z3 may be defined as a range in which both the first sensor 11 and the second sensor 12 are used to control the robot 10.

Further, when the second sensor 12 is a position measuring instrument, it is preferable that the third range Z3 is defined in an orthogonal three-dimensional coordinate system, which is fixed on the robot supporting part 19 of the robot 10. Further, when the second sensor 12 is a combination of a tape-type linear scale and an encoder, which are prepared for full-closed control, the third range Z3 is preferable to be defined in each axial coordinate system using the angle of each shaft of the robot 10 as a dimension. However, the third range Z3 stored by the range storage unit 23 may be defined in another dimension which can express the operating range Z0 of the robot 10 and the range Z2 in which the second sensor 12 can be used. Further, the range storage unit 23 may define a range, which can deform, appear, or disappear depending on the time, as the third range Z3.

Further, the robot control device 20 includes a ratio setting unit 24 for setting the ratio between the first control input and the second control input with respect to control inputs to the motor M, based on the comparison between the third range Z3 stored by the range storage unit 23 and the position and posture of the robot 10.

When, for example, the second sensor 12 is a position measuring instrument attached to the tip end of the robot 10, the third range Z3 defined in the aforementioned orthogonal three-dimensional coordinate system is compared with the three-dimensional position of the second sensor 12 calculated from the posture of the robot 10. Alternatively, when the second sensor 12 is a combination of a tape-type linear scale and an encoder for full-closed control, the third range defined in the aforementioned coordinate system using the position of each shaft of the robot 10 as a dimension is compared with the position of each shaft of the robot 10, which represents the position of the encoder for reading values of the linear scale.

When, for example, the second sensor 12 is outside of the third range Z3, the ratio between the first control input and the second control input, which is set by the ratio setting unit 24, is 1:0. When the second sensor is within the third range Z3, the ratio between the first control input and the second control input, which is set by the ratio setting unit 24, is 0:1.

Further, when the second sensor 12 is located in the vicinity of the border of the third range Z3, the ratio is set depending on, for example, the place of the second sensor 12, so that the first control input and the second control input are smoothly switched. Specifically, as the second sensor 12 moves from the outside of the third range Z3 to the inside of the third range Z3 beyond the border of the third range Z3, the aforementioned ratio is switched, in a stepwise manner, from 1:0 to 0:1 via, for example, 0.99:0.01, 0.98:0.02 . . . , 0.01:0.99. When the aforementioned ratio is changed from 1:0 to 0:1 at once, an impact may occur at the time of changing. In contrast, when the ratio is changed in a stepwise manner, an impact can be prevented from arising.

Further, the robot control device 20 includes an addition unit 25 for adding the first control input and the second control input together in accordance with the ratio set by the ratio setting unit 24. Further, the robot control device 20 includes a control performing unit 29 for performing feedback control of the motor M, in accordance with the control input calculated by the addition unit 25, to drive the robot 10. Note that, in FIG. 1, the control input calculated by the addition unit 25 is directly input to the motor M. However, the control input calculated by the addition unit 25 may be input to the motor M after being treated by a predetermined correction.

Further, as shown in FIG. 1, a transmission unit 26 for transmitting an output of the ratio setting unit 24 to an operator is provided. The transmission unit 26 transmits an output of the ratio setting unit 24 to an operator in the form of at least one of a visual signal and an audio signal. In, for example, an operation necessary to perform second control using only the second sensor 12, it is necessary to avoid automatically switching to first control using only the first sensor 11. The operator acknowledges such a switching operation via the transmission unit 26, and thus, can provide a suitable response. Further, the transmission unit 26 enables the operator to easily acknowledge the degree of weighting of the first control and the second control.

Figure 3A:
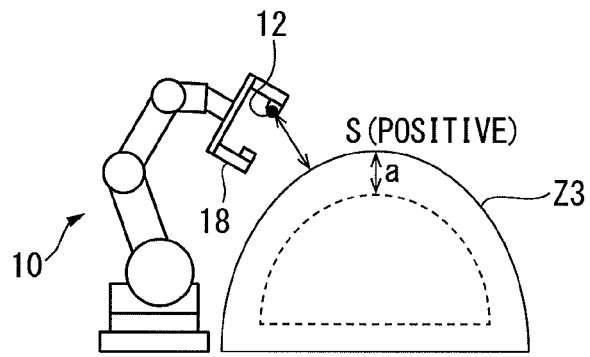
FIG. 3A is a first view of a robot and a third range.
Figure 3B:
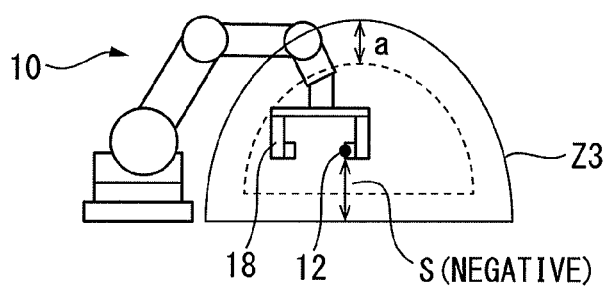
FIG. 3B is a second view of a robot and a third range.

The ratio between the first control input and the second control input, which is set by the ratio setting unit 24, will be described below. This setting of ratio is repeatedly performed when the robot 10 is operated in accordance with an operation program. FIGS. 3A and 3B show a robot and a third range. In FIGS. 3A and 3B, the first sensor 11 is an encoder E connected to the motor M for each shaft of the robot 10, and the second sensor 12 is a laser tracker for measuring the position of the tip end of the robot 10. Note that, in FIGS. 3A and 3B, a direction away from the third range Z3 is defined as a positive direction.

Further, in the embodiment shown in FIGS. 3A and 3B, the first control unit 21 is a feedback control system for calculating a torque command for the motor M based on the detected value of the first sensor 11 as the encoder E. Further, the second control unit 22 is a feedback control system for calculating a torque command for the motor M based on the position of the tip end of the robot 10, which is measured by the second sensor 12 as a laser tracker.

In such circumstances, the ratio setting unit 24 calculates a distance S (shortest distance) between the border of the third range Z3 and the position of the tip end of the robot 10 in the orthogonal coordinate system, which are stored in the range storage unit 23. Subsequently, the ratio setting unit 24 sets the ratio between the first control input and the second control input in accordance with the distance S.

Specifically, when, as shown in FIG. 3A, the position of the tip end of the robot 10 is outside of the third range Z3 ($S \geq 0$), the ratio setting unit 24 sets the ratio between the first control input and the second control input at 1:0. Further, when, as shown in FIG. 3B, the position of the tip end of the robot 10 is within the third range Z3, and is more than a predetermined distance "a" away from the border of the third range Z3 ($-a > S$), the ratio setting unit 24 sets the ratio between the first control input and the second control input at 0:1. Further, when the position of the tip end of the robot 10 is within the third range Z3, and is a predetermined distance a ($a > 0$) or less away from the border of the third range Z3 ($0 > S \geq -a$), the ratio setting unit 24 sets the ratio between the first control input and the second control input at $(S/a+1):(-S/a)$.

Figure 3C:
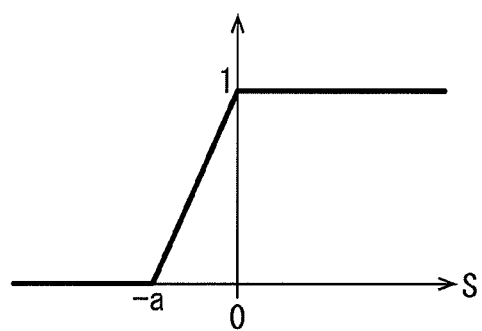
FIG. 3C is a first view of the relationship between the distance between a tip end of a robot and a third range, and the ratio of a first control input.

FIG. 3C shows the relationship between the distance between the tip end of the robot and the third range, and the ratio of the first control input. As shown in FIG. 3C, when the distance S is not more than a predetermined value −a, the ratio of the first control input is 0. Thus, only the second control input is applied. Further, when the distance S is not less than zero, the ratio of the first control input is 1. Thus, the second control input is not applied. Further, when the distance S is between the predetermined value −a and zero, the ratio of the first control input is (S/a+1).

In the embodiment shown in FIGS. 3A to 3C, depending on the distance S between the border of the third range Z3, which is stored by the range storage unit 23 and the position of the tip end of the robot 10, the ratio setting unit 24 varies the ratio between the first control input and the second control input. Thus, it will be understood that the first control input and the second control input can be smoothly and easily switched.

Figure 4A:
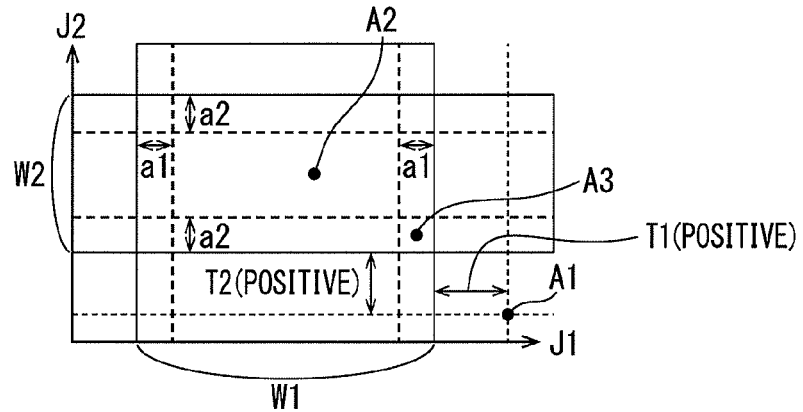
FIG. 4A is a first view of the relationship between the angles of two shafts of a robot.
Figure 4B:
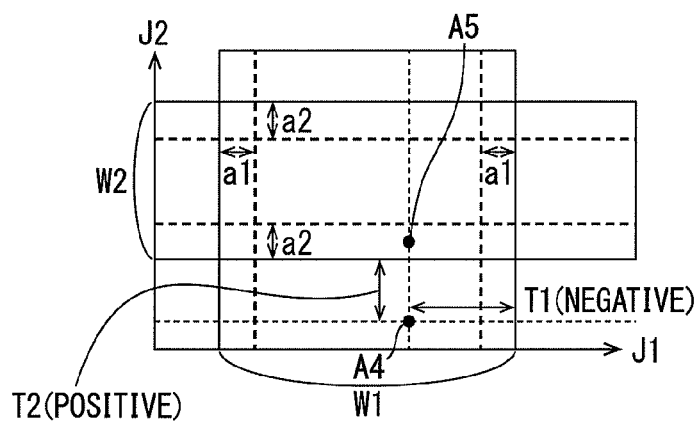
FIG. 4B is a second view of the relationship between the angles of two shafts of a robot.

Further, FIGS. 4A and 4B show the relationship between the angles of two shafts of the robot. In these drawings, the horizontal axis represents the angle of a first shaft J1 of the robot 10, and the vertical axis represents the angle of a second shaft J2 of the robot 10. Note that the vertical axis and the horizontal axis may represent the angle of other shafts of the robot 10.

FIGS. 4A and 4B show an angular range W1, in which the second control input is applied in the first shaft J1, and an angular range W2, in which the second control input is applied in the second shaft J2. When the first shaft J1 and the second shaft J2 are respectively within the angular range W1 and the angular range W2, the tip end of the robot 10 is within the third range Z3, and the second control input is basically applied as follows.

Further, in FIGS. 4A and 4B, dashed lines are drawn at a place which is only a predetermined value a1 shifted from the upper limit of the angular range W1 in the negative direction, and at a place which is only a predetermined value a1 shifted from the lower limit of the angular range W1 in the positive direction. Likewise, dashed lines are also drawn at a place which is only a predetermined value a2 shifted from the upper limit of the angular range W2 in the negative direction, and at a place which is only a predetermined value a2 shifted from the lower limit of the angular range W2 in the positive direction.

Further, in FIGS. 4A and 4B, the first sensor 11 is an encoder E connected to the motor M for each shaft of the robot 10, and the second sensor 12 is a combination of a tape-type linear scale and an encoder for full-closed control.

Further, in the embodiment shown in FIGS. 4A and 4B, the first control unit 21 is a feedback control system for calculating a torque command for the motor M based on the detected value of the first sensor 11 as the encoder E. Further, the second control unit 22 is a feedback control system for calculating a torque command for the motor M based on values of the encoder for full-closed control.

In such circumstances, the ratio setting unit 24 calculates a difference Ti (Character "i" represents the shaft number. Thus, the character i represents 1 or 2 in FIGS. 4A and 4B) between the border of the third range Z3 and the angle of each shaft of the robot 10 in the coordinate system using the position of each shaft of the robot 10 as a dimension, which are stored in the range storage unit 23. In other words, the difference T1 is calculated for the first shaft J1, and the difference T2 is calculated for the second shaft J2.

Specifically, when, as shown by a point A1 in FIG. 4A, the angle of the first shaft J1 and the angle of the second shaft J2 are respectively outside of the angular ranges W1 and W2, the ratio setting unit 24 sets the ratio between the first control input and the second control input at 1:0. Further, when, as shown by a point A2 in FIG. 4A, the angle of the first shaft J1 and the angle of the second shaft J2 are respectively within the angular ranges W1 and W2, and are respectively predetermined values a1 and a2 and more away from the borders of the angular ranges W1 and W2, the ratio setting unit 24 sets the ratio between the first control input and the second control input at 0:1.

Further, when, as shown by a point A3 in FIG. 4A, the angle of the first shaft J1 and the angle of the second shaft J2 are respectively within the angular ranges W1 and W2, and the differences from the upper and lower limits of the angular ranges W1 and W2 are within predetermines values ai (ai>0) (0>T≥−ai), the ratio setting unit 24 sets the ratio between the first control input and the second control input at (Ti/ai+1):(−Ti/ai).

Figure 4C:
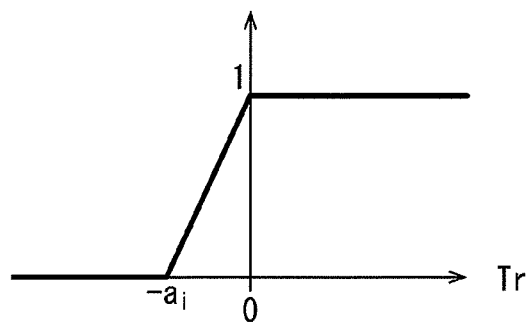
FIG. 4C is a second view of the relationship between the distance between a tip end of a robot and a third range, and the ratio of a first control input.

FIG. 4C shows the relationship between the distance between the tip end of the robot and the third range, and the ratio of the first control input. As shown in FIG. 4C, when the angle Ti is not more than a predetermined value −ai, the ratio of the first control input is 0. Thus, only the second control input is applied. Further, when the angle Ti is not less than zero, the ratio of the first control input is 1. Thus, the second control input is not applied. Further, when the angle Ti is between the predetermined value −ai and zero, the ratio of the first control input is (Ti/ai+1), and the second control input accounts for the remaining ratio.

In this respect, a point A4 shown in FIG. 4B is within the angular range W1, and is outside of the angular range W2. Further, the point A4 is located a predetermined value a1 or more away from the upper limit of the angular range W1. Accordingly, only the second control input is applied in the first shaft J1, and only the first control input is applied in the second shaft J2.

Further, a point A5 shown in FIG. 4B is located within the angular ranges W1 and W2. The point A5 is also located a predetermined value a1 or more away from the upper limit of the angular range W1, and is located a predetermined value a2 or less away from the lower limit of the angular range W2. Accordingly, only the second control input is applied in the first shaft J1, and in the second shaft J2, the ratio of the first control input is (Ti/ai+1), and the second control input accounts for the remaining ratio. Namely, different control operations can be performed in the first shaft J1 and the second shaft J2.

In the embodiment shown in FIGS. 4A to 4C, depending on the difference between the border of the third range Z3 and the angle of each shaft of the robot 10, which is stored by the range storage unit 23, the ratio setting unit 24 varies the ratio between the first control input and the second control input for each shaft. Thus, it will be understood that the first control input and the second control input can be smoothly and easily switched.

As described above, in the present invention, only the first control input is applied within the operating range Z0 of the robot 10 and in the outside of the third range Z3, and only the second control input is applied within the third range Z3. Thus, the operating range of the robot 10 is not restricted.

Further, in the present invention, based on the comparison of the third range Z3 included in both the operating range Z0 of the robot 10 and the second range Z2, in which the second sensor 12 can be used, with the position and posture of the robot 10, the weighting of the first control without using the second sensor 12 and the second control using the second sensor 12 is performed. Thus, the first control and the second control can be smoothly switched.

Effect of the Invention

In a first aspect of the invention, based on the comparison of a third range included in both the operating range of a robot and a second range, in which a second sensor (additional sensor) can be used, with the position and posture of the robot, the weighting of first control without using the second sensor (additional sensor) and second control using the second sensor is performed. Thus, the first control and the second control can be smoothly switched.

In a second aspect of the invention, the third range can be automatically decided.

In a third aspect of the invention, the weighting varies based on, for example, the distance between the border of the third range and the present position of the robot. Thus, the first control and the second control can be smoothly and easily switched. Further, an impact which may occur in the switching can be prevented.

In a fourth aspect of the invention, the ratio is changed in a stepwise manner, and accordingly, the first control and the second control can be further smoothly and easily switched.

In a fifth aspect of the invention, an operator can easily acknowledge the degree of weighting of the first control and the second control.

The present invention has been described above using exemplary embodiments. However, a person skilled in the art would understand that the aforementioned modifications and various other modifications, omissions, and additions can be made without departing from the scope of the present invention.

The invention claimed is:

1. A robot control device for controlling a robot to be driven by a motor, comprising:
   a first sensor which can be used in a first range including the entirety of the operating range of the robot;
   a first control unit for calculating a first control input to the motor, using a feedback value from the first sensor;
   a second sensor which can be used in a second range including at least a part of the operating range of the robot;
   a second control unit for calculating a second control input to the motor, using a feedback value from the second sensor or feedback values from both the first sensor and the second sensor;
   a range storing unit for storing a third range included in both the operating range of the robot and the second range;
   a ratio setting unit for setting a ratio between the first control input and the second control input with respect to control inputs to the motor, based on the comparison of the third range stored in the range storing unit and the position and posture of the robot;
   an addition unit for adding the first control input and the second control input together in accordance with the ratio set by the ratio setting unit; and
   a control performing unit for performing feedback control of the motor based on a result of the addition performed by the addition unit.

2. The robot control device according to claim 1, wherein the third range is an overlapping portion of the operating range of the robot and the second range.

3. The robot control device according to claim 1, wherein the ratio setting unit sets a ratio between the first control input and the second control input with respect to control inputs to the motor, based on at least one of a distance between the border of the third range, which is stored in the range storing unit, and the present position of the robot, and a difference between the border of the third range and the angle of each of shafts of the robot.

4. The robot control device according to claim 1, wherein the ratio setting unit sets, in a stepwise manner, a ratio between the first control input and the second control input with respect to control inputs to the motor.

5. The robot control device according to claim 1, comprising a transmission unit for transmitting an output of the ratio setting unit to an operator.

* * * * *